(12) United States Patent
Kaneko et al.

(10) Patent No.: US 10,647,849 B2
(45) Date of Patent: May 12, 2020

(54) EPOXY RESIN COMPOSITION, PREPREG, CARBON FIBER-REINFORCED COMPOSITE MATERIAL, AND MANUFACTURING METHODS THEREFOR

(71) Applicant: TOHO TENAX CO., LTD., Tokyo (JP)

(72) Inventors: Toru Kaneko, Tokyo (JP); Yuko Okano, Tokyo (JP)

(73) Assignee: TOHO TENAX CO., LTD., Tokyo (JP)

( * ) Notice: Subject to any disclaimer, the term of this patent is extended or adjusted under 35 U.S.C. 154(b) by 117 days.

(21) Appl. No.: 15/562,544

(22) PCT Filed: Mar. 30, 2016

(86) PCT No.: PCT/JP2016/060503
§ 371 (c)(1),
(2) Date: Sep. 28, 2017

(87) PCT Pub. No.: WO2016/159147
PCT Pub. Date: Oct. 6, 2016

(65) Prior Publication Data
US 2018/0105690 A1 Apr. 19, 2018

(30) Foreign Application Priority Data
Mar. 31, 2015 (JP) .................. 2015-074594

(51) Int. Cl.
| | |
|---|---|
| C08J 5/24 | (2006.01) |
| B32B 3/12 | (2006.01) |
| B32B 5/24 | (2006.01) |
| B32B 27/18 | (2006.01) |
| B32B 27/20 | (2006.01) |
| B32B 27/26 | (2006.01) |
| B32B 27/38 | (2006.01) |
| C08L 63/00 | (2006.01) |
| C08L 33/10 | (2006.01) |
| C08L 101/00 | (2006.01) |
| C08G 59/40 | (2006.01) |
| B29C 43/02 | (2006.01) |
| C08K 5/21 | (2006.01) |
| C08K 5/315 | (2006.01) |
| B29C 43/12 | (2006.01) |
| B32B 37/10 | (2006.01) |
| B29C 70/34 | (2006.01) |

(Continued)

(52) U.S. Cl.
CPC .............. *C08L 63/00* (2013.01); *B29C 43/02* (2013.01); *B29C 43/12* (2013.01); *B29C 70/342* (2013.01); *B32B 3/12* (2013.01); *B32B 5/245* (2013.01); *B32B 37/10* (2013.01); *C08G 59/40* (2013.01); *C08J 5/24* (2013.01); *C08K 5/21* (2013.01); *C08K 5/315* (2013.01); *C08L 33/10* (2013.01); *C08L 101/00* (2013.01); *B29K 2105/0881* (2013.01); *B29K 2307/04* (2013.01); *B29K 2663/00* (2013.01); *B29L 2009/00* (2013.01); *C08J 2363/00* (2013.01); *C08J 2433/10* (2013.01); *C08J 2477/00* (2013.01); *C08J 2481/06* (2013.01); *C08L 2205/02* (2013.01); *C08L 2205/035* (2013.01)

(58) Field of Classification Search
None
See application file for complete search history.

(56) References Cited

U.S. PATENT DOCUMENTS

| | | | | |
|---|---|---|---|---|
| 4,740,540 A | * | 4/1988 | Kameda | B32B 27/04 523/457 |
| 5,439,746 A | * | 8/1995 | Suzuki | C08L 63/00 428/413 |

(Continued)

FOREIGN PATENT DOCUMENTS

| | | | | |
|---|---|---|---|---|
| JP | 11181389 A | * | 7/1999 | ............ C09J 163/00 |
| JP | H11-199755 A | | 7/1999 | |

(Continued)

OTHER PUBLICATIONS

Machine translation of JP-11181389-A (no date).*
International Search Report dated May 16, 2016, mailed May 31, 2016.
English Translation of International Search Report dated May 16, 2016, mailed May 31, 2016.

*Primary Examiner* — Michael J Feely
(74) *Attorney, Agent, or Firm* — Norris McLaughlin P.A.

(57) ABSTRACT

The present invention provides an epoxy resin composition comprising at least the following component [A], component [B] and component [C], the epoxy resin composition being characterized in that: the mixture of component [A] and component [B] is a mixture that, when temperature is increased at 2° C./min, begins to thicken at temperature (T1) and completes thickening at temperature (T2), temperature (T1) being 80-110° C. and temperature (T1) and temperature (T2) satisfying the relationship of expression (1) 5° C.≤(T2−T1)≤20° C. expression (1); and the mixture of component [A] and component [C] is a mixture that, when temperature is increased at 2° C./min, begins to cure at temperature (T3), temperature (T1) and temperature (T3) satisfying the relationship of expression (2) 5° C.≤(T3−T1)≤80° C. expression (2).

Component [A]: epoxy resin
Component [B]: thickening particle
Component [C]: curing agent.

10 Claims, 1 Drawing Sheet

(51) Int. Cl.
*B29K 105/08* (2006.01)
*B29K 307/04* (2006.01)
*B29K 663/00* (2006.01)
*B29L 9/00* (2006.01)

(56) References Cited

U.S. PATENT DOCUMENTS

| | | |
|---|---|---|
| 2006/0035088 A1 | 2/2006 | Takano et al. |
| 2009/0198012 A1 | 8/2009 | Sakata et al. |
| 2011/0184091 A1 | 7/2011 | Mizuki et al. |
| 2014/0147676 A1 | 5/2014 | Hattori et al. |
| 2016/0002460 A1 | 1/2016 | Nomura et al. |
| 2016/0130431 A1 | 5/2016 | Nagano et al. |
| 2016/0280871 A1* | 9/2016 | Kaneko ................... C08L 33/06 |
| 2017/0282516 A1* | 10/2017 | Teranishi ................. B32B 5/28 |

FOREIGN PATENT DOCUMENTS

| | | |
|---|---|---|
| JP | 2005-213352 A | 8/2005 |
| JP | 2007-191633 A | 8/2007 |
| JP | 2009-292976 A | 12/2009 |
| JP | 2009-292977 A | 12/2009 |
| JP | 2010-248379 A | 11/2010 |
| JP | 2011-190430 A | 9/2011 |
| JP | 2013-022834 A | 2/2013 |
| WO | 2004/48435 A | 6/2004 |
| WO | 2008/001705 A | 1/2008 |
| WO | 2010/035859 A | 4/2010 |
| WO | 2014/142024 A | 9/2014 |
| WO | 2015/012348 A | 1/2015 |

* cited by examiner

EPOXY RESIN COMPOSITION, PREPREG, CARBON FIBER-REINFORCED COMPOSITE MATERIAL, AND MANUFACTURING METHODS THEREFOR

This application is a 371 application of PCT/JP2016/060503 filed Mar. 30, 2016, which claims foreign priority benefits under 35 U.S.C. § 119 of Japanese Application No. 2015-074594 filed Mar. 31, 2015, the disclosures of each of which are incorporated by reference herein in their entirety.

TECHNICAL FIELD

The present invention relates to an epoxy resin composition, a prepreg obtained by impregnating a reinforcing fiber base material with this epoxy resin composition, and a method for manufacturing a fiber-reinforced composite material using this prepreg. Particularly, the present invention relates to a prepreg suitable for manufacturing a molded product requiring high heat resistance and impact resistance, and a method for manufacturing a fiber-reinforced composite material using this prepreg. When this prepreg is compounded with a honeycomb core or a foam core, the resin composition itself constituting the prepreg is a prepreg that can also function as an adhesive to the honeycomb core and the foam core.

BACKGROUND ART

Since a fiber-reinforced composite material (hereinafter referred to as "FRP") is lightweight and has high strength and high rigidity, it has been used in a wide range of fields including sports and leisure applications such as fishing rods and golf shafts and industrial applications such as automobiles and aircrafts. For manufacturing FRP, a method of using an intermediate material (prepreg) impregnated with a resin in a fiber reinforcing material layer made of long fibers of reinforcing fibers or the like is suitably used. A molded article made of FRP can be obtained by cutting the prepreg into a desired shape and then shaping, and curing this cut prepreg under heat and pressure.

In the field of aircraft, high mechanical characteristics such as heat resistance and impact resistance are required. Generally, a prepreg using an epoxy resin can provide a molded product having high mechanical characteristics, but requires a long molding time. Therefore, a carbon fiber-reinforced composite material having high mechanical characteristics such as heat resistance and impact resistance and being able to be molded in short time is desired.

In the press molding capable of short-time molding, high-temperature and high-pressure conditions of 100 to 150° C. and 1 to 15 MPa are usually used (Patent Literature 1). This high-temperature and high-pressure condition can shorten the curing time of a resin constituting a prepreg. Further, gas contained in the prepreg can be discharged by making the resin constituting the prepreg in a mold flow appropriately. However, when press molding is performed under the high-temperature and high-pressure conditions, the temperature of the resin constituting the prepreg rises and the viscosity of the resin remarkably decreases. As a result, depending on the structure of the mold, the outflow of the resin from a sheared edge portion occurs severely (hereinafter, the phenomenon that resin flows out of the prepreg by heating and pressurizing in the molding process is also referred to as "resin flow"). Therefore, the obtained FRP has a portion not impregnated with the resin composition (resin withering) and poor appearance such as fiber meandering, and a poor performance due to them.

In Patent Literature 2, there is described a method of suppressing resin flow by using a high-viscosity epoxy resin or adding a thermoplastic resin to an epoxy resin. However, when a high-viscosity epoxy resin is used, the resin viscosity at room temperature (25° C.) also increases. Therefore, the handling properties of a prepreg are remarkably low, such as difficulty of a laminating work.

In Patent Literatures 3 to 5, there are described prepregs for high-cycle press molding in which the handling properties of a prepreg at room temperature are improved and resin flow is suppressed without lowering Tg and a curing rate. In the resins used in the prepregs described in Patent Literatures 3 to 5, resin viscosity is increased by dissolving a thermoplastic resin in a liquid epoxy resin. However, since the resin viscosity at the time of preparing the prepreg also increases, there is a case where the impregnation properties of the resin into a reinforcing fiber base material layer are lowered, and thus voids may be formed in the FRP after molding.

Further, in the field of aircraft, mechanical characteristics such as high heat resistance and impact resistance are necessary, and thus various methods have been proposed for the purpose of improving impact resistance and interlayer toughness. Particularly, many techniques in which a material different from a matrix resin is interposed between layers to absorb fracture energy have been proposed (Patent Literature 6). However, the curing time of a resin generally takes 120 minutes or more, and it is difficult to perform short-time molding.

In conventional resin compositions, a resin composition in which the viscosity of an epoxy resin in an optimum molding temperature zone for short-time molding can be controlled and which can obtain a molded product having high mechanical characteristics such as heat resistance and impact resistance, and a prepreg using the resin composition have not been found. Therefore, it is required to develop a prepreg using an epoxy resin, which can be applied to short-time molding and can obtain a molded product having high mechanical characteristics such as heat resistance and impact resistance.

CITATION LIST

Patent Literature

Patent Literature 1: WO 2004/48435 A
Patent Literature 2: JP 2005-213352 A
Patent Literature 3: JP 2009-292976 A
Patent Literature 4: JP 2009-292977 A
Patent Literature 5: JP 2010-248379 A
Patent Literature 6: JP 2011-190430 A

SUMMARY OF INVENTION

Technical Problem

At the time of molding of FRP, a resin composition in a state where viscosity is lowered by heating is pressurized, and thereby the resin composition violently flows in the inside and on the surface of a prepreg. Therefore, a portion not impregnated with the resin composition (resin withering) of the resin composition is formed in the inside or on the surface of the FRP obtained by the outflow of the resin composition from the inside of the prepreg. Further, due to the flow of the resin composition, the arrangement of a reinforcing fiber base material is disturbed. As a result, the appearance and physical properties of the obtained FRP are deteriorated. Furthermore, in the case of using a conventional resin composition capable of obtaining a molded article having high mechanical characteristics such as heat resistance and impact resistance, variations tend to occur in the performance of the FRP to be obtained, and high original mechanical characteristics cannot be stably obtained.

An object of the present invention is to provide a resin composition which can sufficiently impregnate a reinforcing fiber base material layer with a resin composition, has high handling properties of a prepreg at room temperature, and suppresses resin flow during molding. That is, there is provided a resin composition which can suppress the resin flow during molding while maintaining high impregnation properties of a resin and high handling properties of a prepreg. Another object of the present invention is to provide a resin composition which exhibits a small viscosity change with respect to a temperature change during resin impregnation or molding. A still another object of the present invention is to provide a resin composition which can stably manufacture FRP having high mechanical characteristics such as heat resistance and impact resistance. A still another object of the present invention is to provide a prepreg obtained by impregnating a reinforcing fiber base material layer with the above resin composition and a method for manufacturing a FRP using the prepreg.

Solution to Problem

The present inventors found that the above problems can be solved by blending thickening particles swelling at a predetermined temperature to increase viscosity with an epoxy resin composition constituting a prepreg and thus controlling the viscosity of the epoxy resin composition. Based on this finding, the present invention has been completed.

The present invention for solving the above problems is described below.

[1] An epoxy resin composition, including at least: component [A]; component [B]; and component [C], wherein the mixture of component [A] and component [B] is a mixture that initiates thickening at temperature (T1) and completes thickening at temperature (T2) when temperature increases at 2° C./min, the temperature (T1) being 80 to 110° C., and the temperature (T1) and the temperature (T2) satisfying a relationship of the following formula (1)

$$5° C. \leq (T2-T1) \leq 20° C. \quad (1),\text{ and}$$

the mixture of component [A] and component [C] is a mixture that initiates curing at temperature (T3) when temperature increases at 2° C./min, and the temperature (T1) and the temperature (T3) satisfying a relationship of the following formula (2)

$$5° C. \leq (T3-T1) \leq 80° C. \quad (2).$$

Component [A]: epoxy resin
Component [B]: thickening particles
Component [C]: curing agent

[2] The epoxy resin composition according to [1], wherein the viscosity ($\eta 2$) of the epoxy resin composition at the temperature (T2) is 5 to 300 Pa·s.

[3] The epoxy resin composition according to [1], wherein the component [C] contains dicyandiamide and a urea compound.

[4] The epoxy resin composition according to [1], further including component [D], wherein at least a part of the component [D] is dissolved in the component [A].

Component [D]: thermoplastic resin

[5] The epoxy resin composition according to any one of [1] to [4], wherein the blending proportion of the component [B] and the component [D] is 3 to 20 parts by mass of the component [B] and 5 to 35 parts by mass of the component [D] with respect to 100 parts by mass of the component [A].

[6] The epoxy resin composition according to any one of [1] to [5], wherein the component [A] contains 40 to 85 mass % of a glycidylamine type epoxy resin.

[7] The epoxy resin composition according to any one of [1] to [6], wherein the component [B] is a polymer having one or more polymerization units selected from the group consisting of a methacrylic acid ester-based compound, an acrylic acid ester-based compound, and a vinyl-based compound.

[8] The epoxy resin composition according to any one of [1] to [7], wherein the component [B] contains an alkyl methacrylate polymer having an average polymerization degree of 4,000 to 40,000

[9] The epoxy resin composition according to any one of [1] to [8], wherein the glass transition temperature of a molded product obtained by heating and curing at 180° C. for 10 minutes is 160° C. or higher.

[10] A prepreg, including:
a reinforcing fiber base material made of carbon fiber; and
the epoxy resin composition according to any one of [1] to [9],
wherein the prepreg is formed by impregnating the reinforcing fiber base material with a part or all of the epoxy resin composition.

[11] The prepreg according to [10], wherein the reinforcing fiber base material is a mat formed of short fibers having a fiber length of 5 to 100 mm.

[12] A method for manufacturing a carbon fiber-reinforced composite material, including: heating and pressing the prepreg according to [10] in a mold at a temperature of 130 to 180° C. and a pressure of 0.2 to 10 MPa for 10 to 30 minutes.

[13] A method for manufacturing a carbon fiber-reinforced composite material, including:
laminating the prepregs according to [10] on both sides of a honeycomb core to obtain a honeycomb core laminate having a honeycomb core therein;
sequentially stacking the honeycomb core laminate and a film bag in a mold to seal the honeycomb core laminate between the mold and the film bag; and
evacuating a space formed between the mold and the film bag and heating and pressing the honeycomb core laminate at a temperature increase rate of 1 to 50° C./min, a pressure of 0.1 to 0.7 MPa and a temperature of 130 to 180° C. for 10 to 30 minutes.

[14] A method for manufacturing a carbon fiber-reinforced composite material, including:
laminating the prepregs according to [10] on both sides of a foam core to obtain a foam core laminate having a foam core therein;
sequentially stacking the foam core laminate and a film bag in a mold to seal the foam core laminate between the mold and the film bag; and
evacuating a space formed between the mold and the film bag and heating and pressing the foam core laminate at a temperature increase rate of 1 to 50° C./min, a pressure of 0.1 to 0.7 MPa and a temperature of 130 to 180° C. for 10 to 30 minutes.

Advantageous Effects of Invention

The epoxy resin composition of the present invention is originally low in viscosity although the viscosity of the resin composition is controlled using the thickening particles [B]. Therefore, the prepreg prepared using the epoxy resin composition of the present invention is excellent in handling properties at room temperature.

The epoxy resin composition of the present invention has a temperature zone in which resin viscosity increases due to the action of the thickening particles [B] by heating during resin impregnation or molding and a viscosity change with respect to a temperature change is small. It is possible to stabilize the quality of FRP without precisely controlling temperature conditions and pressure conditions during molding, by performing molding in the temperature zone in which the viscosity change is small.

In the prepreg prepared using the epoxy resin composition of the present invention, excessive resin flow is unlikely to occur during heating and pressing molding. As a result, the poor appearance, poor performance, malfunction of molds, and the like of the obtained FRP are suppressed. Further, it is possible to stably manufacture a high-performance FRP reflecting high heat resistance and high impact resistance of the epoxy resin composition.

The prepreg of the present invention can be suitably used particularly for short-time molding. Therefore, the method for manufacturing the FRP of the present invention, performed using the prepreg of the present invention, has high productivity.

DESCRIPTION OF EMBODIMENTS

The epoxy resin composition of the present invention includes an epoxy resin [A], thickening particles [B], and a curing agent [C]. The epoxy resin composition is characterized in that the mixture of an epoxy resin [A] and thickening particles [B] is a mixture that initiates thickening at temperature (T1) and completes thickening at temperature (T2) when temperature increases at 2° C./min, the temperature (T1) is 80 to 110° C., and the temperature (T1) and the temperature (T2) satisfy a relationship of the following formula (1):

$$5° C. \leq (T2-T1) \leq 20° C. \quad (1),$$

and in that the mixture of component [A] and component [C] is a mixture that initiates curing at temperature (T3) when temperature increases at 2° C./min, and the temperature (T1) and the temperature (T3) satisfy a relationship of the following formula (2):

$$5° C. \leq (T3-T1) \leq 80° C. \quad (2).$$

Unless otherwise specified, the viscosity in this specification refers to the viscosity when the temperature is raised at a rate of 2° C./min.

The thickening initiation temperature (T1) is 80 to 110° C., and preferably 85 to 110° C. The thickening completion temperature (T2) is preferably 85 to 130° C., and more preferably 90 to 130° C.

Further, T2-T1 is 5 to 20° C., and preferably 7 to 20° C. When T2-T1 is less than 5° C., at the time of molding, the viscosity of the resin composition impreganated in the prepreg rapidly increases, and the viscosity of the resin composition impregnated in the prepreg becomes too high, so that defects such as voids are formed inside the obtained FRP, so as to easily cause performance defects. When T2-T1 is more than 20° C., at the time of molding, the viscosity of the resin composition impregnated in the prepreg is not stabilized, and the resin composition violently flows, so that poor appearance and poor performance such as resin withering and fiber meandering tend to occur in the obtained FRP.

The curing initiation temperature (T3) is preferably 90 to 130° C., and more preferably 90 to 120° C. Further, T3-T1 is 5 to 80° C., preferably 5 to 50° C., and more preferably 5 to 30° C.

When T3-T1 is less than 5° C., at the time of molding, the curing of the epoxy resin starts before the completion of the thickening of the resin by the thickening particles, and the flow of the resin cannot be controlled, so that poor appearance and poor performance such as resin withering and fiber meandering tend to occur in the obtained FRP. When T3-T1 is more than 80° C., it takes time to cure the resin, and the productivity at the time of FRP molding deteriorates.

In the present invention, in the mixture of epoxy resin [A] and thickening particles [B], preferably, when the temperature was raised at a rate of 2° C./min, the viscosity (η2) of the mixture at the thickening completion temperature (T2) satisfies a relationship of the following formula (3):

$$5 \text{ Pa·s} \leq \eta 2 \leq 300 \text{ Pa·s} \quad (3).$$

When η2 is less than 5 Pa·s, the viscosity of the resin composition impregnated in the prepreg is not stabilized, and the resin composition violently flows, so that poor appearance and poor performance such as resin withering and fiber meandering tend to occur in the obtained FRP. When η2 is more than 300 Pa·s, at the time of molding, the viscosity of the resin composition impregnated in the prepreg becomes too high, so that defects such as voids are easily formed inside the obtained FRP. η2 is more preferably 10 to 250 Pa·s and particularly preferably 25 to 200 Pa·s.

Figure 1:
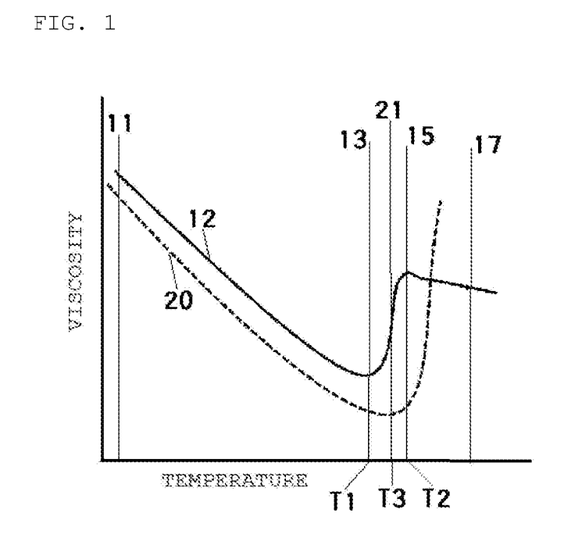
FIG. 1 is an example of a viscosity curve of a mixture of an epoxy resin [A] and thickening particles [B] and a viscosity curve of a mixture of an epoxy resin [A] and a curing agent [C].

FIG. 1 is an example of the viscosity curve of a mixture of epoxy resin [A] and thickening particles [B] and the viscosity curve of a mixture of epoxy resin [A] and curing agent [C].

Hereinafter, the mixture of epoxy resin [A] and thickening particles [B] is referred to as a "thickening particle mixture", and the mixture of epoxy resin [A] and curing agent [C] is referred to as a "curing agent mixture". Unless otherwise specified, the viscosity curve in this specification means a temperature-viscosity curve when the temperature is raised at 2° C./min.

In FIG. 11, 12 is a viscosity curve of the thickening particle mixture. In the temperature zone from 11 to 13, the viscosity of the thickening particle mixture decreases with the increase of temperature. In FIG. 11, the thickening particle mixture turns to rapidly increase in viscosity in the temperature zone from 13 to 15 after reaching the lowest viscosity at 13. This rapid increase in viscosity is due to the swelling of thickening particles [B] in the mixture. This temperature (reference numeral 13) at which the rapid increase in viscosity initiates is defined as thickening initiation temperature (T1).

The viscosity of the thickening particle mixture is highest at 15. This temperature is in a temperature zone in which the thickening effect due to the thickening particles [B] reaches saturation. Thereafter, in the temperature zone from 15 to 17, the viscosity gradually decreases. Temperature 15 at which the viscosity begins to decrease again is defined as thickening completion temperature (T2).

In FIG. 1, 20 is a viscosity curve of the mixture of epoxy resin [A] and curing agent [C] (curing agent mixture). The viscosity of the curing agent mixture decreases with the increase of temperature. The curing agent mixture turns to increase in viscosity due to a curing reaction after reaching the lowest viscosity at 21. This temperature at which this viscosity turns to increase is defined as curing initiation temperature (T3).

The thickening particle mixture of the present invention has a temperature zone (15 to 17) having substantially constant viscosity. The viscosity at this temperature zone is viscosity suitable for molding a prepreg. That is, the thickening particle mixture exhibits a viscosity suitable for molding in a wide temperature range. Therefore, the prepreg prepared using the epoxy resin composition of the present invention can be used to manufacture a stable quality FRP without precisely controlling the temperature and pressure conditions during molding.

The glass transition temperature of the molded product obtained by curing the epoxy resin composition of the present invention while heating at 180° C. for 10 minutes is preferably 160° C. or higher, and more preferably 170° C. or higher. When the glass transition temperature is 160° C. or higher, even if a FRP product is used under a condition of heat being applied, such as painting process, deformation hardly occurs in the product, thus which is preferable.

The epoxy resin composition of the present invention including the epoxy resin [A], the thickening particles [B], and the curing agent [C] has a viscosity at 50° C. of preferably 50 to 1000 Pa·s, more preferably 70 to 700 Pa·s, and particularly preferably 80 to 500 Pa·s. In the case of preparing a prepreg using a resin composition having a viscosity of less than 50 Pa·s, the handling properties of the prepreg deteriorate due to the stickiness of the resin composition. When the viscosity of the resin composition is more than 1000 Pa·s, the impregnation of the reinforcing fiber base material layer with the resin composition tends to be insufficient.

Further, epoxy resin composition of the present invention further including a thermoplastic resin [D] in addition to the epoxy resin [A], the thickening particles [B], and the curing agent [C], at least a part of the thermoplastic resin [D] being dissolved in the epoxy resin of the epoxy resin [A], has a viscosity at 50° C. of preferably 50 to 1000 Pa·s, more preferably 70 to 700 Pa·s, and particularly preferably 80 to 500 Pa·s. In the case of preparing a prepreg using a resin composition having a viscosity of less than 50 Pa·s, the handling properties of the prepreg deteriorate due to the stickiness of the resin composition. When the viscosity of the resin composition is more than 1000 Pa·s, the impregnation of the reinforcing fiber base material layer with the resin composition tends to be insufficient.

(1-1) Epoxy Resin [A]

In the present invention, examples of the epoxy resin [A] include bifunctional epoxy resins, such as bisphenol-based epoxy resin, alcohol-based epoxy resin, biphenyl-based epoxy resin, hydrophthalic acid-based epoxy resin, dimer acid-based epoxy resin, and alicyclic epoxy resin; glycidyl ether-based epoxy resins, such as tetrakis (glycidyloxyphenyl)ethane and tris (glycidyloxyphenyl)methane; glycidyl amine-based epoxy resins such as tetraglycidyldiaminodiphenylmethane; naphthalene-based epoxy resins; and novolak-based epoxy resins, such as phenol novolak-based resin and cresol novolak-based epoxy resin.

Examples of the epoxy resin [A] further include multifunctional epoxy resins, such as phenol-based epoxy resins. Further, various modified epoxy resins, such as urethane modified epoxy resin and rubber modified epoxy resin, can also be used.

In particular, an epoxy resin having an aromatic group in a molecule is preferable, and an epoxy resin having either a glycidyl amine structure or a glycidyl ether structure is more preferable. An alicyclic epoxy resin can also be suitably used.

Examples of the epoxy resin having a glycidyl amine structure include various isomers, such as N,N,N',N'-tetraglycidyl diaminodiphenylmethane, N,N,O-triglycidyl-p-aminophenol, N,N,O-triglycidyl-m-aminophenol, N,N,O-triglycidyl-3-methyl-4-aminophenol, and triglycidylaminocresol.

Examples of the epoxy resin having a glycidyl ether structure include bisphenol A type epoxy resin, bisphenol F type epoxy resin, bisphenol S type epoxy resin, phenol novolak type epoxy resin, and cresol novolak type epoxy resin.

These epoxy resins may have a non-reactive substituent on an aromatic ring structure or the like, if necessary. Examples of the non-reactive substituent include an alkyl group such as a methyl group, an ethyl group, or an isopropyl group; an aromatic group such as a phenyl group; an alkoxyl group; an aralkyl group; and a halogen group such as chlorine or bromine.

Examples of the bisphenol type epoxy resin include bisphenol A type resin, bisphenol F type resin, bisphenol AD type resin, and bisphenol S type resin. Specific examples thereof include jER 815, jER 828, jER 834, jER 1001, and jER 807 (trade name), manufactured by Mitsubishi Chemical Corporation; Epomic R-710 (trade name) manufactured by Mitsui Petrochemical Co., Ltd.; and EXA 1514 (trade name) manufactured by Dainippon Ink & Chemicals, Inc.

Examples of the alicyclic epoxy resin include Araldite CY-179, CY-178, CY-182, CY-183 (trade name) manufactured by Huntsman Corporation.

Examples of the phenol novolak type epoxy resin include jER 152 and jER 154 (trade name), manufactured by Mitsubishi Chemical Corporation; DEN 431, DEN 485, and DEN 438 (trade name), manufactured by Dow Chemical Company; and Epiclon N 740 (trade name) manufactured by DIC Corporation. Examples of the cresol novolak type epoxy resin include Araldite ECN 1235, ECN 1273, and ECN 1280 (trade name), manufactured by Huntsman Corporation; EOCN 102, EOCN 103, and EOCN 104 (trade name), manufactured by Nippon Kayaku Co., Ltd.; Epototo YDCN-700-10 and Epototo YDCN-704 (trade name), manufactured by Nippon Steel & Sumikin Chemical Co., Ltd.; and Epiclon N 680 and Epicron N 695 (trade name), manufactured by DIC Corporation.

Examples of the epoxy resin having a glycidyl amine structure include Sumiepoxy ELM 434, Sumiepoxy ELM 120, Sumiepoxy ELM 100 (trade name), manufactured by Sumitomo Chemical Co., Ltd.; Araldite MY 0500, Araldite MY 0510, Araldite MY 0600, Araldite MY 720, Araldite MY 721, Araldite MY 9512, Araldite MY 9612, Araldite MY 9634, and Araldite MY 9663 (trade name), manufactured by Huntsman Advanced Materials Corporation; jER 604 and jER 630 (trade name), manufactured by Mitsubishi Chemical Corporation; and Bakelite EPR 494, Bakelite EPR 495, Bakelite EPR 496, and Bakelite EPR 497 (trade name), manufactured by Bakelite AG Corporation.

As the various modified epoxy resins, Adekaresin EPU-6 and EPU-4 (trade name), manufactured by Asahi Denka K.K., are exemplified as urethane-modified bisphenol A epoxy resin.

These epoxy resins can be appropriately selected to be used alone or in combination of two or more. Among these, bifunctional epoxy resins represented by the bisphenol type epoxy resin include resins of various grades ranging from liquid to solid depending on the difference in molecular weight. Therefore, these resins are advantageously blended for the purpose of adjusting the viscosity of the resin composition.

In order to enhance the heat resistance of FRP, it is preferable to use an epoxy resin having a glycidyl amine structure. The blending amount of the epoxy resin having a glycidyl amine structure is preferably 40 to 85 parts by mass, and more preferably 45 to 80 parts by mass in 100 parts by mass of the epoxy resin [A]. When the blending amount of the epoxy resin having a glycidyl amine structure is less than 40 parts by mass, sufficient heat resistance may not be obtained in some cases. When the blending amount thereof is more than 85 parts by mass, heat resistance is sufficient, but the resin becomes brittle, so that FRP having sufficient impact characteristics may not be obtained in some cases.

(1-2) Thickening Particle [B]

As the thickening particles [B] used in the present invention, particles obtained by copolymerizing a single unsaturated compound or a plurality of unsaturated compounds with a crosslinkable monomer are exemplified. Although not particularly limited, it is desirable to include a resin having at least one of an acrylic acid ester-based compound, a methacrylic acid ester-based compound, and a vinyl compound as a monomer unit.

The acrylic acid ester-based compound used for the thickening particles [B] refers to a compound having an acrylic acid ester structure and a derivative thereof, and examples thereof include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, and cyclohexyl acrylate.

The methacrylic acid ester-based compound used for the thickening particles [B] refers to a compound having a methacrylic acid ester structure and a derivative thereof, and examples thereof include methyl methacrylate, ethyl methacrylate, n-propyl methacrylate, isopropyl methacrylate, n-butyl methacrylate, n-hexyl methacrylate, and cyclohexyl methacrylate.

The vinyl compound used for the thickening particles [B] refers to a compound having a polymerizable vinyl structure, and examples thereof include styrene, α-methyl styrene, divinyl benzene, and a compound in which these aromatic rings are substituted with various functional groups such as an alkyl group and a halogen atom.

The thickening particle [B] may be a polymer including one or two or more polymerization units of a methacrylic acid ester-based compound, an acrylic acid ester-based compound, and a vinyl-based compound, and may also be a resin obtained by mixing two or more kinds of resins having different structures. Further, the thickening particles [B] may be a composite resin ionically crosslinked by adding (iii) metal ions to (i) a polymer including at least one of an acrylic acid ester-based compound, a methacrylic acid ester-based compound, and a diene-based compound, and (ii) a polymer including an acrylic acid ester-based compound or a methacrylic acid ester-based compound and a radically polymerizable unsaturated carboxylic acid.

The thickening particle [B] is preferably a polymer including one or two or more polymerization units selected from the group consisting of a methacrylic acid ester-based compound, an acrylic acid ester-based compound, and a vinyl-based compound, and is more preferably an alkyl methacrylate polymer.

It is preferable that the thickening particles [B] have an average polymerization degree of 4,000 to 40,000.

As the thickening particles [B], it is also preferable to use commercially available products made of an alkyl methacrylate polymer having no core-shell structure, such as Zefiac F 325 and Zefiac F 320 (all manufactured by Aica Kogyo Co., Ltd.). The alkyl methacrylate polymer having a core-shell structure is not preferable because this polymer is difficult to swell in a thermosetting resin composition due to the shell structure, and the effect of increasing the viscosity is low.

The particle diameter and the like of the thickening particles [B] are not particularly limited, but the average particle diameter thereof is preferably 0.3 to 10 μm, and more preferably 0.5 to 8 μm. The content of the thickening particles [B] is preferably from 3 to 20 parts by mass, more preferably 4 to 18 parts by mass, and particularly preferably from 5 to 15 parts by mass, with respect to 100 parts by mass of the epoxy resin [A].

The thickening particles [B] dispersed in the epoxy resin [A] swell in the epoxy resin [A] by heating. The swelling of the thickening particles [B] proceeds with the temperature and time, and the viscosity of the epoxy resin [A] rises rapidly with the swelling of the thickening particles [B].

Since the viscosity of the epoxy resin [A] before the swelling of the thickening particles [B] is low, the impregnation properties of the epoxy resin [A] into a reinforcing fiber base material layer are excellent. When the thickening particles [B] swell to increase the viscosity of the epoxy resin [A] in the reinforcing fiber base material layer, resin flow during molding is suppressed.

As a result, the resin impregnation properties and the suppression of resin flow can be compatible at a high level.

(1-3) Curing Agent [C]

Examples of the curing agent [C] used in the present invention include dicyandiamide, an aromatic amine-based curing agent, various isomers of a urea-based curing agent, and an imidazole compound. Dicyandiamide (DICY) or an imidazole compound that is an amide-based curing agent is preferable from the viewpoint of excellent curability and physical properties after curing.

Specific examples of dicyandiamide (DICY) include jER Cure DICY 7, DICY 15 (trade name) manufactured by Mitsubishi Chemical Corporation, and the like.

When using DICY, it is more preferable to use it in combination with a urea-based curing agent. Since DICY is not so high in solubility in the epoxy resin, it is necessary to heat it to a high temperature of 160° C. or higher in order to sufficiently dissolve it. However, when DICY is used in combination with a urea-based curing agent, the dissolution temperature thereof can be lowered.

Examples of the urea-based curing agent include phenyl dimethyl urea (PDMU), toluene bisdimethyl urea (TB-DMU), and the like.

The blending amount of the curing agent [C] in the epoxy resin [A] is 6 to 20 parts by mass with respect to 100 parts by mass of the epoxy resin [A]. When the blending amount of the curing agent is 6 parts by mass or more, crosslinking density becomes sufficient, and a sufficient curing rate can be obtained.

When the blending amount of the curing agent is 20 parts by mass or less, it is possible to suppress defects such as the deterioration of mechanical characteristics of the cured resin due to excessive presence of the curing agent and the turbidity of the cured resin.

When DICY and a urea curing agent (PDMU, TBDMU, or the like) are used in combination as the curing agent [C], it is preferable that the blending amount of DICY is 3 to 10 parts by mass with respect to 100 parts by mass of the epoxy resin [A], and the blending amount of the urea-based curing agent is 3 to 10 parts by mass with respect to 100 parts by mass of the epoxy resin [A] (provided that the total amount of DICY and the urea-based curing agent is 6 to 20 parts by mass).

As an example of the imidazole compound, there is exemplified an imidazole compound in which hydrogen at the 5-position of 1H-imidazole is substituted with a hydroxymethyl group and hydrogen at the 2-position of imidazole is substituted with a phenyl group or a toluyl group. Examples of this imidazole compound include 2-phenyl-4,5-dihydroxymethylimidazole, 2-phenyl-4-methyl-5-hydroxymethylimidazole, 2-phenyl-4-benzyl-5-hydroxymethylimidazole, 2-paratoluyl-4-methyl-5-hydroxymethylimidazole, 2-metatoluyl-4-methyl-5-hydroxymethylimidazole, 2-metaltoluyl-4,5-dihydroxymethylimidazole, and 2-paratoluoyl-4,5-dihydroxymethylimidazole. Among these, 2-phenyl-4,5-dihydroxymethylimidazole, 2-phenyl-4-methyl-5-hydroxymethylimidazole, 2-paratoluyl-4-methyl-5-hydroxymethylimidazole, 2-metatoluyl-4-methyl-5-hydroxymethylimidazole, 2-metatoluoyl-4,5-dihydroxymethylimidazole, 2-paratoluyl-4,5-dihydroxymethylimidazole are more preferable.

Examples of imidazole compound include 1-(2-hydroxy-3-phenoxypropyl)-2-methylimidazole, and an adduct compound obtained by reacting a glycidyl ether type thermosetting resin with 2-methylimidazole. In particular, an adduct compound obtained by reacting an aryl glycidyl ether type thermosetting resin with 2-methyl imidazole is preferable because it can make the physical properties of a cured product of the epoxy resin composition excellent. When an imidazole compound is used as the curing agent, the content of the imidazole compound is preferably 2 to 30 parts by mass, and more preferably 3 to 15 parts by mass, with respect to 100 parts by mass of the epoxy resin [A].

(1-4) Thermoplastic Resin [D]

As the thermoplastic resin [D] used in the present invention, a group of thermoplastic resins belonging to engineering plastics, such as polysulfone, polyether imide, polyphenylene ether, polyamide, polyacrylate, polyaramide, polyester, polycarbonate, polyphenylene sulfide, polybenzimidazole, polyimide, polyether sulfone polyketone, polyether ketone, polyether ether ketone, and polyvinyl formal, are more preferably used. In terms of excellent heat resistance, toughness and handling properties, polyimide, polyetherimide, polysulfone, polyether sulfone, and polyvinyl formal are particularly preferably used.

The blending method of the thermoplastic resin [D] can take any method. For example the powdered thermoplastic resin [D] may be kneaded and dispersed in the epoxy resin [A] using a kneader or the like, or the thermoplastic resin [D] may be dissolved in the epoxy resin [A] by heating the thermoplastic resin [D] in the epoxy resin [A]. It is preferable that the epoxy resin composition of the present invention is used by dissolving a part of the thermoplastic resin [D] in the epoxy resin [A] and dispersing the remaining thermoplastic resin [D] in the epoxy resin [A].

The particle diameter of the powdered thermoplastic resin [D] is preferably 0.2 to 100 μm, and more preferably 0.5 to 80 μm.

The blending amount of the thermoplastic resin [D] is preferably 5 to 35 parts by mass, and more preferably 10 to 35 parts by mass, with respect to 100 parts by mass of the epoxy resin [A].

(1-5) Other Additives

In the epoxy resin composition of the present invention, a flame retardant, an inorganic filler, and an internal mold release agent may be blended.

As the flame retardant, a phosphorus-based flame retardant is exemplified. The phosphorus-based flame retardant is not particularly limited as long as it contains a phosphorus atom in the molecule, and examples thereof include organic phosphorus compounds such as a phosphate ester, a condensed phosphate ester, a phosphazene compound, and phosphinate; organic phosphorus compounds such as polyphosphate; and red phosphorus.

The phosphate ester refers to an ester compound of phosphoric acid and an alcohol compound or a phenol compound. In the present invention, flame retardancy can be imparted to the fiber-reinforced composite material by blending the phosphate ester.

Specific examples of the phosphate ester include trimethyl phosphate, triethyl phosphate, tributyl phosphate, tri(2-ethylhexyl) phosphate, tributoxyethyl phosphate, triphenyl phosphate, tricresyl phosphate, trixylenyl phosphate, tris (isopropylphenyl) phosphate, tris(phenylphenyl) phosphate, trinaphthyl phosphate, cresyl diphenyl phosphate, xylenyl diphenyl phosphate, diphenyl (2-ethylhexyl) phosphate, di(isopropylphenyl) phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenyl phosphine oxide, tricresyl phosphine oxide, diphenyl methane phosphonate, diethyl phenyl phosphonate, resorcinol polyphenyl phosphate, resorcinol poly(di-2,6-xylyl) phosphate, bisphenol A polycresyl phosphate, hydroquinone poly(2, 6-xylyl) phosphate, and condensates thereof.

Examples of the condensed phosphate ester include resorcinol bis (di-2, 6-xylyl) phosphate, resorcinol bis(diphenyl phosphate), and bisphenol A bis(diphenyl phosphate). As a commercially available product of resorcinol bis (di-2,6-xylyl) phosphate, PX-200 (manufactured by Daihachi Chemical Industry Co., Ltd.) is exemplified. As a commercially available product of resorcinol bis (diphenyl phosphate), CR-733S (manufactured by Daihachi Chemical Industry Co., Ltd.) is exemplified. As a commercially available product of bisphenol A bis(diphenyl phosphate), CR-741 (manufactured by Daihachi Chemical Industry Co., Ltd.) is exemplified. In particular, resorcinol bis (di-2,6-xylyl) phosphate is preferably used from the viewpoint of excellent curability and heat resistance.

The phosphazene compound can impart flame retardancy to the FRP by containing a phosphorus atom and a nitrogen atom in the molecule. The phosphazene compound is not particularly limited as long as it contains no halogen atom and has a phosphazene structure in the molecule. As commercially available products of the phosphazene compound, SPR-100, SA-100, SPB-100, and SPB-100L (all manufactured by Otsuka Chemical Co., Ltd.), and FP-100 and FP-110 (all manufactured by Fushimi Pharmaceutical Co., Ltd.) are exemplified.

Examples of the phosphinate compound include aluminum dialkylphosphinate, aluminum tris diethylphosphinate, aluminum trismethylethylphosphinate, aluminum trisdiphenylphosphinate, zinc bisdiethylphosphinate, zinc bismethylethylphosphinate, zinc bisdiphenylphosphinate, titanyl bisdiethylphosphinate, titanyl bismethylethylphosphinate, and titanyl bisdiphenylphosphinate. Examples of the polyphosphate compound include melamine polyphosphate, melam polyphosphate, and melem polyphosphate.

The flame retarding effect of phosphorus atoms is considered to be due to the promoting effect of carbide formation of phosphorus atoms, and is influenced by the content of phosphorus atom in the epoxy resin composition. In the present invention, the content of phosphorus atoms in the epoxy resin composition is preferably 1.2 to 4.0 mass %, and more preferably 1.4 to 4.0 mass %. When the content of phosphorus atoms in the epoxy resin is less than 1.2 mass %, the flame retarding effect may not be sufficiently obtained in some cases. When the content of phosphorus atoms in the epoxy resin is more than 4.0 mass %, in some cases, the heat resistance of the FRP decreases, and the mechanical characteristics, particularly, rigidity and Charpy impact value of the FRP may decrease. The phosphorus content (mass %) referred to here is obtained by mass (g) of phosphorus atoms/mass (g) of epoxy resin composition×100. The content of phosphorus atoms in the epoxy resin composition can be obtained by the above calculation method. Further, the content thereof can also be obtained by the organic element analysis or ICP-MS (inductively coupled plasma mass spectrometry) of the epoxy resin composition or FRP.

Among the above-mentioned phosphorus-based flame retardants, a solid phosphorus-based flame retardant having a melting point of 200° C. or higher are preferably used, because handling properties are good and a good fiber-reinforced composite material (FRP) can be obtained. More preferably, a phosphinate compound is used.

Examples of the inorganic filler include aluminum borate, calcium carbonate, silicon carbonate, silicon nitride, potassium titanate, basic magnesium sulfate, zinc oxide, graphite, calcium sulfate, magnesium borate, magnesium oxide, a silicate mineral, and a metal hydroxide. In particular, it is preferable to use a silicate mineral or a metal hydroxide. As a commercially available product of the silicate mineral, THIXOTROPIC AGENT DT 5039 (manufactured by Huntsman-Japan KK) is exemplified. Examples of the metal hydroxide include aluminum hydroxide and magnesium hydroxide. Among these, in the case of imparting flame retardant properties, aluminum hydroxide is preferable in terms of thermal cracking temperature and endothermic amount during cracking. As the metal hydroxide, a commercially available product may be used, or a product synthesized by a known preparation method may be used. Examples of commercially available aluminum hydroxide include C-303, C-301, C-300GT, C-305, C-3250 and CM-450, manufactured by Sumitomo Chemical Co., Ltd., and Higilite H-42 and H-43, manufactured by Showa Denko K.K.

Examples of commercially available magnesium hydroxide include Magster #5, #4, and #2, Ekomag PZ-1 and Z-10, manufactured by Tateho Chemical Industries Co., Ltd.

In the present invention, the content of the inorganic filler in the epoxy resin composition is preferably 5 to 30 mass %, and more preferably 7 to 25 mass %. When the content of the inorganic filler is less than 5 mass %, the flame retardant effect may not be sufficiently obtained in some cases. When the content of the inorganic filler more than 30 mass %, mechanical characteristics, particularly, rigidity and Charpy impact value may decrease.

Examples of the internal mold release agent include metal soaps, plant waxes such as polyethylene wax and carbana wax, fatty acid ester-based release agents, silicone oil, animal waxes, and fluorine-based nonionic surfactants. The blending amount of these internal mold release agents is preferably 0.1 to 5 parts by mass, and more preferably 0.2 to 2 parts by mass, with respect to 100 parts by mass of the epoxy resin. Within this range, the releasing effect from a mold is suitably exhibited.

Examples of commercially available products of the internal mold release agent include MOLD WIZ (registered trademark) INT 1846 (manufactured by AXEL PLASTICS RESEARCH LABORATORIES INC.), Licowax S, Licowax P, Licowax OP, Licowax PE 190, Licowax PED (manufactured by Clariant Japan K.K.), and stearyl stearate (SL-900 A; manufactured by Riken Vitamin Co., Ltd.).

(1-6) Method for Manufacturing Epoxy Resin Composition

The epoxy resin composition can be manufactured by mixing the epoxy resin [A], the thickening particles [B], and the curing agent [C]. The order of the mixing thereof is not limited. That is, the epoxy resin composition may be manufactured by mixing the epoxy resin [A] and the thickening particles [B] to prepare a thickening particle mixture and then adding the curing agent [C] to the thickening particle mixture, or may also be manufactured by simultaneously mixing the epoxy resin [A], the thickening particles [B], and the curing agent [C].

In addition, when the thermoplastic resin [D] is mixed for the purpose of improving impact resistance characteristics, the epoxy resin composition can be manufactured by mixing the epoxy resin [A], the thickening particles [B], the curing agent [C], and the thermoplastic resin [D], and the order of the mixing thereof is not limited.

The method for manufacturing the epoxy resin composition is not particularly limited, and any conventionally known method may be used. As mixing temperature, a range of 40 to 120° C. can be exemplified. When the mixing temperature is higher than 120° C., in some cases, a curing reaction partially proceeds to lower the impregnation properties into the reinforcing fiber base material layer, or the storage stability of the obtained resin composition and the prepreg produced using the resin composition deteriorates. When the mixing temperature is lower than 40° C., in some cases, the viscosity of the resin composition is high, which may make substantial mixing difficult. The mixing temperature is in a range of preferably 50 to 100° C., and more preferably 50 to 90° C.

As a mixing machine, a conventionally known mixing machine can be used. Specific examples thereof include a roll mill, a planetary mixer, a kneader, an extruder, a Banbury mixer, a mixing container equipped with stirring blades, and a horizontal mixing tank. The mixing of the respective components can be carried out in the atmosphere or in an inert gas atmosphere. When the mixing is carried out in the atmosphere, an atmosphere in which temperature and humidity are controlled is preferable. Although not particularly limited, for example, it is preferable that the mixing is carried out in an atmosphere in which temperature is controlled at a constant temperature of 30° C. or lower or in a low humidity atmosphere having a relative humidity of 50% RH or lower.

(2) Prepreg

The prepreg of the present invention includes a reinforcing fiber base material and an epoxy resin composition. The epoxy resin composition is partially or entirely impregnated into the reinforcing fiber base material layer to be integrated with the reinforcing fiber base material.

The shape of the prepreg of the present invention may be a prepreg sheet in which reinforcing fibers are formed in a sheet shape, and may also be a strand prepreg in which reinforcing fibers are formed in a strand shape.

Since the prepreg of the present invention uses a resin composition having a low original viscosity, it is easy to impregnate the reinforcing fiber base material layer with a resin. Further, during heat molding, the viscosity of the resin composition is increased by using the thickening particles [B] in a predetermined temperature zone. Therefore, the epoxy resin composition has a temperature zone in which viscosity change becomes moderate, and resin flow from the inside of the prepreg can be suppressed by molding in this temperature zone. As a result, the FRP produced using the prepreg of the present invention is less prone to molding defects such as resin withering.

The content ratio (RC) of the epoxy resin composition is preferably 15 to 60 mass %, more preferably 20 to 50 mass %, and particularly preferably 25 to 45 mass %, based on the total mass of the prepreg. When the content ratio is less than 15 mass %, voids and the like are formed in the obtained FRP, and thus which the mechanical characteristics and the like of the FRP may be deteriorated in some cases. When the content ratio is more than 60 mass %, the reinforcing effect by a reinforcing fiber becomes insufficient, and thus the mechanical characteristics and the like of the obtained FRP may be deteriorated in some cases.

The content ratio (RC) of the epoxy resin composition is obtained by immersing the prepreg in sulfuric acid and eluting the resin composition impregnated in the prepreg. Specifically, the content ratio (RC) is obtained by the following method.

First, the prepreg is cut into 100 mm×100 mm to prepare a test piece, and its mass is measured. Next, the test piece of this prepreg is immersed in sulfuric acid and boiled as necessary. Thus, the resin composition impregnated in the prepreg is decomposed and eluted into the sulfuric acid. Thereafter, the remaining fibers are separated by filtration, washed with sulfuric acid, and dried to measure the mass of the fibers. The content ratio of the resin composition is calculated from the mass change before and after the decomposition by sulfuric acid.

It is preferable that the prepreg form of the present invention includes a reinforcing layer composed of a reinforcing fiber base material and an epoxy resin composition impregnated in the reinforcing fiber base material layer, and a resin coating layer applied on the surface of the reinforcing layer. The thickness of the resin coating layer is preferably 2 to 50 µm. When the thickness of the resin coating layer is less than 2 µm, in some cases, tackiness becomes insufficient, and the molding processability of the prepreg may remarkably deteriorate. When the thickness of the resin coating layer more than 50 µm, in some cases, it is difficult to wind up the prepreg into a roll with a uniform thickness, and molding accuracy remarkably deteriorates. The thickness of the resin coating layer is more preferably 5 to 45 µm, and particularly preferably 10 to 40 µm.

(2-1) Reinforcing Fiber Base Material

As the reinforcing fiber base material, a base material composed of carbon fiber, glass fiber, aramid fiber, silicon carbide fiber, polyester fiber, ceramic fiber, alumina fiber, boron fiber, metal fiber, mineral fiber, rock fiber, and slug fiber is exemplified. Among these reinforcing fibers, carbon fiber, glass fiber, and aramid fiber are preferable. Carbon fiber is more preferable in terms of having good specific strength and specific elastic modulus and obtaining a lightweight and high-strength FRP. Polyacrylonitrile (PAN)-based carbon fiber is particularly preferable in terms of excellent tensile strength.

When PAN-based carbon fiber is used as the reinforcing fiber, the tensile elastic modulus thereof is preferably 100 to 600 GPa, more preferably 200 to 500 GPa, and particularly preferably 230 to 450 GPa. Further, the tensile strength thereof is 2000 to 10000 MPa, and preferably 3000 to 8000 MPa. The diameter of the carbon fiber is preferably 4 to 20 µm, and more preferably 5 to 10 µm. The mechanical characteristics of the FRP obtained by using such a carbon fiber can be improved.

It is preferable that the reinforcing fiber base material is formed in a sheet shape and then used. Examples of the reinforcing fiber base material sheet may include a sheet in which a large number of reinforcing fibers are aligned in one direction, a bi-directional woven fabric such as a plain weave fabric or twill weave fabric, a multi-axis woven fabric, a nonwoven fabric, a mat, a knit, a braided cord, and paper made of reinforcing fibers.

The thickness of the sheet-shaped reinforcing fiber base material is preferably 0.01 to 3 mm, and more preferably 0.1 to 1.5 mm. These reinforcing fiber base materials may contain a known sizing agent in a known content.

As the prepreg of the present invention, a strand prepreg in which reinforcing fibers are formed in a strand shape can be used. The strand prepreg is fabricated by fractionating a sheet-shaped unidirectional prepreg. The width of the strand prepreg is preferably 3 to 20 mm, and more preferably 6 to 10 mm. Further, it is preferable that the strand prepreg is cut in a length direction to obtain a short fiber prepreg. The fiber length is preferably from 5 to 100 mm, and more preferably from 10 to 50 mm. It is preferable that the short fiber prepreg after cutting is formed in a mat shape to prepare a prepreg mat.

(2-2) Method of Preparing Prepreg

The method of preparing the prepreg of the present invention is not particularly limited, and any conventionally known method can be adopted. Specifically, a hot melt method or a solvent method can be suitably adopted.

The hot melt method is a method in which a resin composition is applied on a release paper in the form of a thin film to form a resin composition film, and the resin composition film is laminated on a reinforcing fiber base material and heated under pressure to impregnate the reinforcing fiber base material layer with the resin composition.

The method of forming the resin composition into the resin composition film is not particularly limited, and any conventionally known method can be used. Specifically, the resin composition film is obtained by casting the resin composition on a support such as release paper or film using a die extruder, an applicator, a reverse roll coater, a comma coater or the like. The resin temperature at the time of forming the resin composition film is appropriately determined according to the composition and viscosity of the resin composition. Specifically, the same temperature condition as the mixing temperature in the aforementioned epoxy resin composition preparation method is suitably used. The impregnation of the resin composition into the reinforcing fiber base material layer may be carried out once, or may also be carried out several times.

The solvent method is a method in which the epoxy resin composition is varnished using a suitable solvent, and the reinforcing fiber base material layer is impregnated with this varnish.

The prepreg of the present invention can be suitably prepared by a hot-melt method not using a solvent, among these conventional methods.

When the reinforcing fiber base material layer is impregnated with the epoxy resin composition film by the hot melt method, the impregnation temperature is preferably in a range of 50 to 120° C. When the impregnation temperature is lower than 50° C., in some cases, the viscosity of the epoxy resin is high, and thus the reinforcing fiber base material layer may not be sufficiently impregnated with the resin composition. When the impregnation temperature is higher than 120° C., in some cases, the curing reaction of the epoxy resin composition proceeds, so that the storage stability of the obtained prepreg may deteriorate, or the draping properties thereof may deteriorate. The impregnation temperature is more preferably from 60 to 110° C., and particularly preferably from 70 to 100° C.

When the reinforcing fiber base material layer is impregnated with the epoxy resin composition film by the hot melt method, the impregnation pressure is appropriately determined in consideration of the viscosity, resin flow, or the like of the resin composition.

(3) Fiber-reinforced Composite Material (FRP)

FRP can be obtained by heating, pressing and curing the prepreg of the present invention under specific conditions. Examples of the methods of manufacturing FRP using the prepreg of the present invention include autoclave molding, press molding, internal pressure molding, and vacuum assisted air pressure molding.

(3-1) Autoclave Molding Method

As the method for manufacturing the FRP of the present invention, an autoclave molding method is preferably used. The autoclave molding method is a molding method in which a prepreg and a film bag are sequentially laid on a lower mold of a mold, the prepreg is sealed between the lower mold and the film bag, and the prepreg is heated and pressed by an autoclave molding apparatus while evacuating the space formed by the lower mold and the film bag. It is preferable that heating and pressing is carried out under molding conditions of a temperature increase rate of 1 to 50° C./min, a pressure of 0.2 to 0.7 MPa, and a temperature of 130 to 180° C., for 10 to 30 minutes.

(3-2) Press Molding Method

As the method for manufacturing the FRP of the present invention, a press molding method is preferable from the viewpoint of high productivity and high quality FRP being obtained by making full use of the characteristics of the epoxy resin composition constituting the prepreg. The manufacturing of FRP by the press molding method is carried out by heating and pressing the prepreg of the present invention or a preform formed by laminating the prepregs of the present invention by using a mold. It is preferable that the mold is previously heated to the curing temperature.

The temperature of the mold during press molding is preferably 130 to 180° C. When the molding temperature is 130° C. or higher, a curing reaction can be sufficiently caused, and FRP can be obtained with high productivity. Further, when the molding temperature is 180° C. or lower, resin viscosity is not excessively lowered, and thus excessive flow of the resin in the mold can be suppressed. As a result, it is possible to suppress the outflow of the resin from the mold and the meandering of fibers, so that a high quality FRP can be obtained.

The pressure during molding is 0.2 to 10 MPa. When the pressure is 0.2 MPa or higher, the moderate flow of the resin can be obtained, and the occurrence of poor appearance and voids can be prevented. In addition, since the prepreg adheres sufficiently to the mold, an FRP having a good appearance can be manufactured. When the pressure is 10 MPa or lower, the resin does not flow more than necessary, so that poor appearance of the obtained FRP hardly occurs. In addition, since no excessive load is applied to the mold, the deformation or the like of the mold hardly occurs.

(3-3) Internal Pressure Molding Method

As the method for manufacturing the FRP of the present invention, an internal pressure molding method is also preferably adopted. The internal pressure molding method is a molding method in which a prepreg is laid on the outside of a bag-shaped internal pressure bag to obtain a prepreg laminate having an internal pressure bag therein, this prepreg laminate is placed in a mold to clamp, and the inner pressure bag is inflated in the mold, so that the prepreg is inscribed in the inner wall of the mold, and heated and cured in this state.

A method for manufacturing FRP by the internal pressure molding method will be described. First, the prepregs of the present invention are laid on the upper mold and lower mold of the mold, respectively. Next, an inner pressure bag is sandwiched between the upper mold and the lower mold on each of which the prepreg is laid, and the upper mold and the lower mold are clamped. Thus, a prepreg laminate having the inner pressure bag therein is obtained. Thereafter, the prepreg in the mold is inscribed in the inner wall of the mold by inflating the internal pressure bag in the mold, and the mold is heated in this state, thereby heating and curing the prepreg. After a predetermined time has elapsed, a molded product is taken out from the mold, and the internal pressure bag is removed, so as to obtain FRP.

From the viewpoint of productivity, it is preferable to preheat the mold to the curing temperature before laying the prepreg.

The material of the internal pressure bag is preferably a material having flexibility and excellent heat resistance such as nylon or silicone rubber.

The temperature in the mold during internal pressure molding is preferably 130 to 180° C. When the molding temperature is 130° C. or higher, a curing reaction can be sufficiently caused, and FRP can be obtained with high productivity. Further, when the molding temperature is 180° C. or lower, resin viscosity is not excessively lowered, and thus excessive flow of the resin in the mold can be suppressed. As a result, it is possible to suppress the outflow of the resin from the mold and the meandering of fibers, so that a high quality FRP can be obtained.

The pressure during molding is 0.2 to 2 MPa. When the pressure is 0.2 MPa or higher, the moderate flow of the resin can be obtained, and the occurrence of poor appearance and voids can be prevented. In addition, since the prepreg adheres sufficiently to the mold, an FRP having a good appearance can be manufactured. When the pressure is 2 MPa or lower, a flexible internal pressure bag such as nylon and silicone rubber is hardly broken.

(3-4) Vacuum Assisted Air Pressure Molding Method

As the method for manufacturing the FRP of the present invention, a vacuum assisted air pressure molding method is also preferably used. The vacuum assisted air pressure molding method is a molding method in which a prepreg and a film bag are sequentially laid on a lower mold of a mold, the prepreg is sealed between the lower mold, and the inside of the cavity of the mold, formed by clamping the upper mold and the lower mold, is pressurized with air while evacuating the space formed by the lower mold and the film bag, so as to heat and cure the prepreg.

A method for manufacturing FRP by the vacuum assisted air pressure molding method will be described. First, the prepreg of the present invention are laid on the lower mold of the mold. Next, a film bag is stacked on the prepreg, and the prepreg is sealed between the lower mold and the film bag. Thereafter, the space formed by the lower mold and the film bag is evacuated to bring the prepreg into contact with the lower mold. Further, the inside of the cavity of the mold, formed by clamping the upper mold and the lower mold, is pressurized with air to adhere this prepreg closely to the lower mold. This prepreg is heated and cured by heating the prepreg in this state. After a predetermined time has elapsed, a molded product is taken out from the mold, and the film bag is removed, so as to obtain FRP.

From the viewpoint of productivity, it is preferable that the lower mold has a heating mechanism capable of rapidly heating.

The material of the film bag is preferably a material having flexibility and excellent heat resistance such as nylon or silicone rubber.

It is preferable that the temperature of the mold is 20 to 50° C., and the prepreg and the film bag are stacked in a vacuum state and then heated to 130 to 180° C. at a temperature increase rate of 2 to 100° C./min. When the molding temperature is 130° C. or higher, a curing reaction can be sufficiently caused, and FRP can be obtained with high productivity. Further, when the molding temperature is 180° C. or lower, resin viscosity is not excessively lowered, so that excessive flow of the resin in the mold can be suppressed, and thus the outflow of the resin from the mold and the meandering of fibers can be suppressed, thereby obtaining a high quality FRP.

The pressure during molding is 0.2 to 2 MPa. When the pressure is 0.2 MPa or higher, the moderate flow of the resin can be obtained, and the occurrence of poor appearance and voids can be prevented. In addition, since the prepreg adheres sufficiently to the mold, an FRP having a good appearance can be manufactured. When the pressure is 2 MPa or lower, a flexible internal pressure bag such as nylon and silicone rubber is hardly broken.

The curing time in the manufacturing method of the present invention is 10 to 30 minutes, which is a short time as compared with the conventional one. That is, an FRP having excellent quality can be manufactured with high productivity.

(3-5) Method for Manufacturing a Carbon Fiber-Reinforced Honeycomb Sandwich Material In the method for manufacturing the carbon fiber-reinforced honeycomb sandwich material of the present invention, a honeycomb core laminate in which a prepreg, a honeycomb core, and a prepreg are sequentially laid in a lower mold of a mold is covered with a film bag, the prepreg and the honeycomb core laminate are sealed between the lower mold and the film bag, the space formed by the lower mold and the film bag is evacuated, and heating and pressure-molding are carried out by an autoclave.

It is preferable that heating and pressing is carried out under molding conditions of a temperature increase rate of 1 to 50° C./min, a pressure of 0.1 to 0.7 MPa, and a temperature of 130 to 180° C., for 10 to 30 minutes. In order to enhance the adhesion between the honeycomb core and the prepreg, it is preferable to maintain a vacuum between the lower mold and the film bag from room temperature up to 80 to 100° C. and then release the vacuum.

(3-6) Method for Manufacturing a Foam Core Sandwich Material

In the method for manufacturing the foam core sandwich material of the present invention, a foam core laminate in which a prepreg, a foam core, and a prepreg are sequentially laid in a lower mold of a mold is covered with a film bag, the prepreg and the foam core laminate are sealed between the lower mold and the film bag, the space formed by the lower mold and the film bag is evacuated, and heating and pressure-molding are carried out by an autoclave.

The conditions during molding are the same as those in the method for manufacturing the carbon fiber-reinforced honeycomb sandwich material.

According to the above-described manufacturing method of the present invention, it is possible to suppress the occurrence of defects in the mold during molding. Further, it is possible to obtain a high-quality FRP, in which poor appearance, poor performance, and the like is suppressed, with high productivity.

EXAMPLES

Hereinafter, the present invention will be described in more detail with reference to the following examples, but the present invention is not limited to these examples. The components and test methods used in the present examples and comparative examples are described below.

(Carbon Fiber)
"Tenax (registered trademark)" HTS 40-12 (carbon fiber strand, tensile strength 4.2 GPa, tensile elastic modulus 240 GPa, manufactured by Toho Tenax Co., Ltd.)
"Tenax (registered trademark)" W-3101: (carbon fiber plain weave fabric, manufactured by Toho Tenax Co., Ltd.)

(Epoxy Resin)
"jER (registered trademark)" 154: (semi-solid phenol novolak type epoxy resin, manufactured by Mitsubishi Chemical Corporation)
"jER (registered trademark)" 828: (liquid bisphenol A type epoxy resin, manufactured by Mitsubishi Chemical Corporation)
"jER (registered trademark)" 834: (liquid bisphenol A type epoxy resin, manufactured by Mitsubishi Chemical Corporation)
"jER (registered trademark)" 604: (tetraglycidyl diaminodiphenylmethane type epoxy resin, manufactured by Mitsubishi Chemical Corporation)
"jER (registered trademark)" 630: (p-aminophenol type epoxy resin, manufactured by Mitsubishi Chemical Corporation)
"Epotote (registered trademark)" 704: (cresol novolak type epoxy resin, manufactured by Nippon Steel & Sumikin Chemical Co., Ltd.)

(Thickening Particle)
"Zefiac (registered trademark)" F320: (alkyl methacrylate polymer), average polymerization degree 30,000, manufactured by Aica Kogyo Co., Ltd.)
"Zefiac (registered trademark)" F325: (alkyl methacrylate polymer), average polymerization degree 4,000, manufactured by Aica Kogyo Co., Ltd.)

(Curing Agent)
Dicy 7: (dicyandiamide, manufactured by Mitsubishi Chemical Corporation)
"Omicure (registered trademark)" 24: (2,4'-toluene bis(3, 3-dimethylurea), manufactured by PTI Japan Corporation)

"Omicure (registered trademark)" 52: (4,4'-methylene bis (diphenyldimethylurea), manufactured by PTI Japan Corporation)

DCMU-99: (3,4-dichlorophenyl-1,1-dimethylurea, manufactured by Hodogaya Chemical Co., Ltd.)

4,4'-DDS: 4,4'-diaminodiphenyl sulfone (aromatic amine-based curing agent, manufactured by Wakayama Seika Corporation)

(Thermoplastic Resin)

"Ultrazone (registered trademark)" E2020P: polyether sulfone, manufactured by BASF Corporation, weight average molecular weight 32,000, pulverized so as to have an average particle size of 10 μm by a laser diffraction method and used.

"Ultem (registered trademark)" 1000: polyether imide, manufactured by SABIC Innovative Plastics Co., Ltd.

PA 12: (Polyamide 12, average particle diameter 20 μm, manufactured by Daicel-Evonik Ltd.)

PA 1010: (Polyamide 1010, average particle diameter 20 μm, manufactured by Daicel-Evonik Ltd.)

Grilamide TR-55: (amorphous polyamide, average particle size 20 μm, manufactured by EMS-CHEMIE (Japan) Ltd.)

(Others)

"Zefiac (registered trademark)" F351: (core shell structured acrylic copolymer, manufactured by Aica Kogyo Co., Ltd.)

(Flame Retardant)

Dialkylphosphinic acid aluminum salt (manufactured by Clariant (Japan) K.K., trade name: OP-930, phosphorus content: 23%, solid, decomposition temperature: 300° C. or higher)

Aluminum hydroxide (manufactured by Sumitomo Chemical Co., Ltd., trade name: C-301, solid)

Condensed phosphate ester (manufactured by Daihachi Chemical Industry Co., Ltd., tradename: PX-200, solid, phosphorus content: 23%, melting point: 92° C.)

(Honeycomb Core)

HRP 3/16-4.0 glass honeycomb (thickness 25.4 mm, manufactured by Showa Aircraft Industry Co., Ltd.)

(Foam Core)

"ROHACELL (registered trademark)" 110IG (thickness 10 mm, manufactured by Evonik Corporation)

Examples 1 to 15, Comparative Examples 1 to 6

(1) Preparation of Epoxy Resin Composition

A predetermined amount of epoxy resin [A] and thermoplastic resin [D] to be dissolved in the epoxy resin [A] were put into a kneader at the ratio described in Table 1 or 2, and the mixture was heated to 150° C. while kneading the mixture to completely dissolve solid components. Thereafter, the temperature was lowered to 60° C. while kneading, and thickening particles [B], curing agent [C], thermoplastic resin [D], and the like were added at the ratio described in Table 1 or 2 and stirred for 30 minutes to be uniformly dispersed, so as to obtain an epoxy resin composition.

(2) Measurement of Gelation Time of Epoxy Resin Composition 3 g of the epoxy resin composition was prepared as a sample, and the gelation time of the epoxy resin composition was measured at a temperature of 130° C. using a curastometer IIF-120 (manufactured by JSR Trading Co., Ltd.) in order to trace the curing of a resin.

(3) Evaluation of Viscosity of Epoxy Resin Mixture and Epoxy Resin Composition

A rheometer ARES-RDA manufactured by Rheometrics Co., Ltd. was used. The thickness of the resin between parallel plates having a diameter of 25 mm was set to 0.5 mm. The viscosity was measured up to 180° C. at a temperature increase rate of 2° C./min under the condition of an angular velocity of 10 radian/second. The thickening initiation temperature (T1), the thickening completion temperature (T2), the curing initiation temperature (T3), and the viscosity (η2) at thickening completion temperature were measured by using the obtained temperature-viscosity curve.

(4) Preparation of Prepreg (4-1) Preparation of Unidirectional Prepreg

A unidirectional prepreg was prepared as follows. The above-obtained epoxy resin composition was applied on a release paper using a reverse roll coater to prepare a resin film having a basis weight of 50 g/m$^2$. Next, carbon fibers were aligned in one direction such that the fiber mass per unit area was 190 g/m$^2$, so as to prepare a sheet-shaped reinforcing fiber base material layer. The resin films were stacked on both sides of the reinforcing fiber base material layer, and heated and pressed under the conditions of a temperature of 95° C. and a pressure of 0.2 MPa, so as to prepare a unidirectional prepreg having a carbon fiber content of 65 mass %.

(4-2) Preparation of Fabric Prepreg

A fabric prepreg was prepared as follows. The above-obtained epoxy resin composition was applied on a release paper using a reverse roll coater to prepare a resin film having a basis weight of 65 g/m$^2$. Next, the resin films were stacked on both sides of a W-3101 fabric (fiber mass 197 g/m$^2$), and heated and pressed under the conditions of a temperature of 95° C. and a pressure of 0.2 MPa, so as to prepare a fabric prepreg having a carbon fiber content of 60 mass %.

(5) Measurement of Glass Transition Temperature

A laminate obtained by laminating ten unidirectional prepregs in the direction of [0°] was put into a bag, heated to 150° C. for 30 minutes in the autoclave at a temperature increase rate of 2° C./min, and cured to produce a molded plate (carbon fiber-reinforced composite material). During this time, the interior of the autoclave was pressurized to 0.7 MPa, and the interior of the bag was kept under vacuum.

The glass transition temperature of the carbon fiber-reinforced composite material was measured according to SACMA 18R-94 method. The above molded plate was processed into a test piece having a length (fiber direction) of 55 mm and a width of 12 mm, and the storage elastic modulus G' of the test piece from 30° C. to the rubber elastic region was measured using a rheometer ARES-RDA manufactured by Rheometrics Co., Ltd. under the conditions of a measurement frequency of 1 Hz, a temperature increase rate of 5° C./min, and a strain of 0.01%, with the distance between chucks set to 45 mm. Log G' was plotted with respect to temperature, and the temperature determined from the intersection point of the approximate straight line of the flat area of log G' and the approximate straight line of the area where G' was transited was recorded as glass transition temperature (Tg).

(6) Measurement of Compressive Strength after Impact (CAI)

Twelve laminates obtained by superimposing three sets of four unidirectional prepregs laminated in the direction of [+45°/0°/−45°/90°], and twelve laminates obtained by superimposing three sets of four unidirectional prepregs laminated in the direction of [90°/−45°/0°/+45°] were stacked such that directions of 90° join together, so as to obtain a total of 24 laminates. These laminates were put into a bag, heated to 150° C. for 30 minutes in the autoclave at a temperature increase rate of 2° C./min, and cured to produce a molded plate (carbon fiber-reinforced composite material). During this time, the interior of the autoclave was pressurized to 0.7 MPa, and the interior of the bag was kept under vacuum.

A test piece was cut out from the obtained molded plate, a falling weight impact of 30 J was applied to the center of this test piece, and then the compressive strength of the test piece after impact was measured according to Airbus Industries Test Method AITM 1.0010.

(7) Measurement of Flatwise Strength of Honeycomb Sandwich

A laminate obtained by laminating two fabric prepregs in the direction of [0°/90°] was laminated on the top and bottom of a honeycomb core to obtain a honeycomb core laminate. This honeycomb core laminate was put into a bag, heated to 150° C. for 30 minutes in the autoclave at a temperature increase rate of 2° C./min, and cured to produce a molded plate (carbon fiber-reinforced composite material). Up to 80° C., the interior of the autoclave was pressurized to 0.3 MPa, the interior of the bag was kept under vacuum, and then the vacuum was released. Thus, a honeycomb sandwich panel was obtained.

A test piece having a length of 50 mm and a width of 50 mm was cut out from the obtained honeycomb sandwich panel, and an aluminum block having a length of 50 mm and a width of 50 mm was attached to the upper and lower surfaces of the test piece with an epoxy adhesive. After curing of the adhesive, a tensile test was performed in the vertical direction (thickness direction) of the honeycomb sandwich panel at a tensile rate of 0.5 mm/min according to ASTM C 273 to measure the flatwise strength of the honeycomb sandwich panel.

(8) Determination of Fillet Formation of Honeycomb Sandwich Panel

Figure 2:
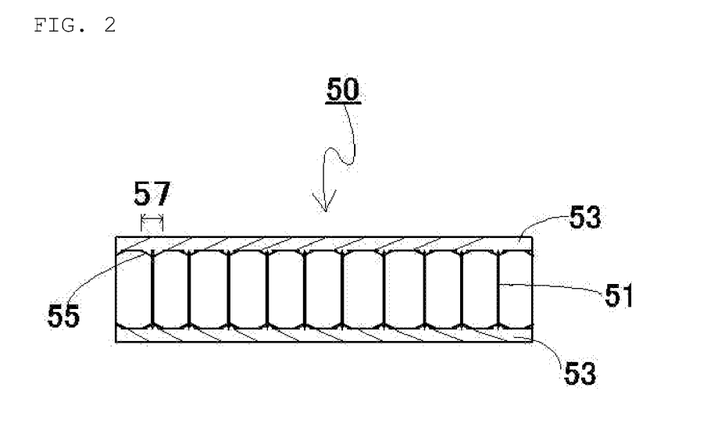
FIG. 2 is a view illustrating an example of an end face of a honeycomb sandwich panel.

The adhesion between a honeycomb core and a carbon fiber-reinforced composite material was evaluated by observing the section of the above-obtained honeycomb sandwich panel. The evaluation was performed by observing the in-plane direction length of the fillet formed at the attachment point between the honeycomb core and the carbon fiber composite material. FIG. 2 is a sectional view of a honeycomb sandwich panel in which a honeycomb core and a carbon fiber composite material are attached. In FIG. 2, reference numeral 50 represents a honeycomb sandwich panel, 51 represents a honeycomb core, and 53 represents a carbon fiber composite material. Further, 55 represents a fillet formed at a contact point between the honeycomb core 51 and the carbon fiber composite material 53. The length 57 of the fillet 55 in the in-plane direction was measured.

Determination of fillet formation

○: good: average length of fillet 0.4 mm or more

Δ: slightly good: average length of fillet 0.2 mm or more and less than 0.4 mm x: poor: average length of fillet less than 0.2 mm (9) Method for Manufacturing Foam Core Composite Material A laminate obtained by laminating four fabric prepregs in the direction of [0°/90°] was laminated on the top and bottom of a foam core (ROHACELL 110IG) to obtain a foam core laminate. This foam core laminate was put into a bag, heated to 150° C. for 30 minutes in the autoclave at a temperature increase rate of 2° C./min, and cured to produce a molded plate (carbon fiber-reinforced composite material). During this time, the interior of the autoclave was pressurized to 0.3 MPa, and the interior of the bag was kept under vacuum. The obtained molded plate was a good molded product with few surface voids.

(10) UL-94V Combustion Test (Carbon Fiber Composite Material Plate)

The above four unidirectional prepregs were laminated in the direction of [0°/90°/90°/0°] to obtain a laminate. This laminate was put into a bag, heated to 150° C. for 30 minutes in the autoclave at a temperature increase rate of 2° C./min, and cured to produce a molded plate (carbon fiber-reinforced composite material).

The obtained carbon fiber composite material having a thickness of 0.8 mm was processed into a test piece (length 127 mm×width 12.7 mm), and a combustion test was carried out according to UL-94V standards using a combustion test machine manufactured by Suga Test Instruments Co., Ltd. The longest combustion time (max) [seconds] among combustion times of respective test pieces, the total combustion time [sec], and the determination results [V-0, V-1, V-2, and fail] were recorded. The results are shown in Tables below.

TABLE 1

| | | Examples | | | | | | | | | | Comparative Examples | | | | |
|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 |
| Epoxy resin [A] | jER 828 | 20 | 20 | 25 | 20 | 40 | 20 | 20 | | 45 | 40 | 20 | 20 | 20 | 20 | 35 |
| | jER 834 | | | | | | | | 40 | | | | | | | |
| | jER 604 | 80 | 80 | 75 | 50 | 60 | 60 | 60 | 40 | 45 | 60 | 80 | 80 | 80 | 80 | 65 |
| | jER 630 | | | | 30 | | | | | | | | | | | |
| | jER 154 | | | | | | 20 | | | | | | | | | |
| | Epotote 704 | | | | | | | | 20 | 10 | | | | | | |
| Thermoplastic resin [D] dissolved in epoxy resin | PES (E2020P) | 6 | | 8 | 12 | 10 | | 6 | | 5 | 5 | 5 | | 6 | 6 | 3 |
| | PEI (Ultem 1000) | | 10 | | | | 10 | | | | | | | | | |
| Thickening particles [B] | Zefiac F320 | 6 | 7 | 10 | | 8 | 8 | 10 | 10 | 6 | 8 | | | | 2 | 15 |
| | Zefiac F325 | | | | 7 | | | | | | | | | | | |
| Thermoplastic resin particles [D] | PES (E2020P) | | | | | | | | | | | | | | | |
| | PA12 | | | | 24 | | | 10 | | | | | 25 | | | |
| | PA1010 | | | 25 | | | 25 | 15 | | | | | | 22 | | |
| | TR55 | 20 | 25 | | | 22 | | | | 20 | 20 | 20 | | | 20 | 10 |
| Curing agent [C] | Dicy 7 | 5 | 5 | 6 | 5 | 6 | 6 | 5 | 5 | 5 | 2 | 6 | 6 | 5 | 5 | 5 |
| | Omicure 24 | 6 | | | 6 | 6 | | 6 | 6 | 6 | | 5 | 5 | | 5 | 5 |
| | Omicure 52 | | 6 | | | | | | | | | | | 6 | | |
| | DCMU-99 | | | 6 | | 5 | | | | | 3 | | | | | |
| | 4,4'-DDS | | | | | | | | | | 10 | | | | | |

TABLE 1-continued

|  |  | Examples |  |  |  |  |  |  |  |  |  | Comparative Examples |  |  |  |  |
|---|---|---|---|---|---|---|---|---|---|---|---|---|---|---|---|---|
|  |  | 1 | 2 | 3 | 4 | 5 | 6 | 7 | 8 | 9 | 10 | 1 | 2 | 3 | 4 | 5 |
| Other additives | Zefiac F351 |  |  |  |  |  |  |  |  |  |  |  |  | 12 |  |  |
| Thickening initiation temperature (T1) (° C.) |  | 100 | 100 | 99 | 82 | 97 | 98 | 98 | 95 | 95 | 97 | None | None | 110 | 100 | 100 |
| Thickening completion temperature (T2) (° C.) |  | 115 | 115 | 115 | 95 | 112 | 112 | 113 | 110 | 110 | 112 | None | None | 165 | 115 | 115 |
| Curing initiation temperature (T3) (° C.) |  | 108 | 112 | 112 | 108 | 106 | 113 | 108 | 108 | 108 | 115 | 110 | 110 | 112 | 114 | 114 |
| Viscosity at the time of thickening completion (η2) (Pa · s) |  | 40 | 55 | 100 | 25 | 60 | 58 | 105 | 110 | 45 | 60 | 0.2 | 0.2 | 1 | 4 | 330 |
| Gelation time (130° C.) (min) |  | 3 | 3.3 | 4 | 3 | 2.8 | 4 | 3 | 3 | 3 | 6 | 3.2 | 3.2 | 3.3 | 3.4 | 3.4 |
| Glass transition temperature (° C.) |  | 192 | 190 | 187 | 193 | 165 | 174 | 191 | 161 | 163 | 170 | 191 | 189 | 190 | 190 | 175 |
| CAI (MPa) |  | 250 | 285 | 295 | 240 | 295 | 300 | 305 | 150 | 275 | 285 | 220 | 180 | 120 | 220 | 200 |
| Honeycomb sandwich flatwise strength (MPa) |  | 4.0 | 4.2 | 4.2 | 4.0 | 4.1 | 4.3 | 4.0 | 3.9 | 4.2 | 4.1 | 2.5 | 2.0 | 2.0 | 2.3 | 2.0 |
| Fillet formation |  | ○ | ○ | ○ | ○ | ○ | ○ | ○ | ○ | ○ | ○ | Δ | X | X | X | X |

TABLE 2

|  |  | Examples |  |  |  |  | Comparative Examples |
|---|---|---|---|---|---|---|---|
|  |  | 11 | 12 | 13 | 14 | 15 | 6 |
| Epoxy resin [A] | jER 828 | 20 | 40 | 45 | 35 | 40 | 35 |
|  | jER 834 |  |  |  |  |  |  |
|  | jER 604 | 80 | 60 | 45 | 65 | 60 | 65 |
|  | jER 630 |  |  |  |  |  |  |
|  | jER 154 |  |  |  |  |  |  |
|  | Epotote 704 |  |  | 10 |  |  |  |
| Thermoplastic resin [D] dissolved in epoxy resin | PES (E2020P) |  | 10 | 7 | 10 | 10 | 10 |
|  | PEI (Ultem 1000) | 10 |  |  |  |  |  |
| Thickening particles [B] | Zefiac F320 | 7 | 8 | 6 | 8 | 7 | 6 |
|  | Zefiac F325 |  |  |  |  |  |  |
| Thermoplastic resin particles [D] | PES (E2020P) | 18 | 20 | 15 |  | 10 | 10 |
|  | PEI (Ultem 1000) |  |  |  | 10 |  |  |
| Curing agent [C] | Dicy 7 | 5 | 6 | 5 | 5 |  | 5 |
|  | Omicure 24 | 7 | 6 | 6 | 6 |  | 6 |
| Other additives | Aluminum hydroxide C-301 |  |  |  |  | 10 |  |
| Flame retardant | Exolit OP 930 | 8 | 8 | 12 | 8 | 6 |  |
|  | PX-200 |  |  |  |  |  | 25 |
| Thickening initiation temperature (T1) (° C.) |  | 100 | 97 | 100 | 97 | 98 | 97 |
| Thickening completion temperature (T2) (° C.) |  | 114 | 112 | 110 | 113 | 112 | 113 |
| Curing initiation temperature (T3) (° C.) |  | 112 | 112 | 116 | 112 | 110 | 112 |
| Viscosity at the time of thickening completion (η2) (Pa · s) |  | 70 | 60 | 50 | 55 | 45 | 1 |
| Gelation time (130° C.) (min) |  | 4 | 4.5 | 5 | 4.5 | 3.5 | 5 |
| Glass transition temperature (° C.) |  | 190 | 163 | 161 | 163 | 162 | 132 |
| Fillet formation |  | ○ | ○ | ○ | ○ | ○ | X |
| Evaluation of flame retardancy of CFRP plate UL-94 | max (second) | 3 | 5 | 4 | 5 | 5 | 6 |
|  | Total (second) | 11 | 15 | 18 | 15 | 18 | 25 |
|  | Determination | V-0 | V-0 | V-0 | V-0 | V-0 | V-0 |

The invention claimed is:

1. An epoxy resin composition, comprising at least:

component [A];

3 to 20 parts by mass of component [B] with respect to 100 parts by mass of the component [A];

6 to 20 parts by mass of component [C] with respect to 100 parts by mass of the component [A]; and 5 to 35 parts by mass of component [D] with respect to 100 parts by mass of the component [A], wherein a viscosity at 50° C. of the epoxy resin composition is 50 to 1000 Pa·s, the mixture of component [A] and component [B] is a mixture that initiates thickening at temperature (T1) and completes thickening at temperature (T2) when temperature increases at 2° C./min, the temperature (T1) being 85 to 110° C., and the temperature (T1) and the temperature (T2) satisfying a relationship of the following formula (1)

$$5° C. \leq (T2-T1) \leq 20° C. \qquad \text{formula (1), and}$$

the mixture of component [A] and component [C] is a mixture that initiates curing at temperature (T3) when temperature increases at 2° C./min, and the temperature (T1) and the temperature (T3) satisfying a relationship of the following formula (2)

$$5° C. \leq (T3-T1) \leq 80° C. \qquad \text{formula (2), and}$$

wherein component [A] is epoxy resin containing 40 to 85 mass % of a glycidylamine type epoxy resin, component [B] is thickening particles which is a polymer including one or more polymerization units selected from the group consisting of a methacrylic acid ester-based compound, an acrylic acid ester-based compound, and a vinyl-based compound, and wherein the thickening particles are dispersed in and swell in the epoxy resin [A] by heating, component [C] is curing agent, and component [D] is thermoplastic resin in which at least a part is dissolved in the component [A].

2. The epoxy resin composition according to claim 1, wherein the viscosity (η2) of the epoxy resin composition at the temperature (T2) is 5 to 300 Pa·s.

3. The epoxy resin composition according to claim 1, wherein the component [C] contains dicyandiamide and a urea compound.

4. The epoxy resin composition according to claim 1, wherein the component [B] contains an alkyl methacrylate polymer having an average polymerization degree of 4,000 to 40,000.

5. The epoxy resin composition according to claim 1, wherein the glass transition temperature of a molded product obtained by heating and curing at 180° C. for 10 minutes is 160° C. or higher.

6. A prepreg, comprising:
a reinforcing fiber base material made of carbon fiber; and the epoxy resin composition according to claim 1,
wherein the prepreg is formed by impregnating the reinforcing fiber base material with a part or all of the epoxy resin composition.

7. The prepreg according to claim 6, wherein the reinforcing fiber base material is a mat formed of short fibers having a fiber length of 5 to 100 mm.

8. A method for manufacturing a carbon fiber-reinforced composite material, comprising:
heating and pressing the prepreg according to claim 6 in a mold at a temperature of 130 to 180° C. and a pressure of 0.2 to 10 MPa for 10 to 30 minutes.

9. A method for manufacturing a carbon fiber-reinforced composite material, comprising:
laminating the prepregs according to claim 6 on both sides of a honeycomb core to obtain a honeycomb core laminate having a honeycomb core therein;
sequentially stacking the honeycomb core laminate and a film bag in a mold to seal the honeycomb core laminate between the mold and the film bag; and
evacuating a space formed between the mold and the film bag and heating and pressing the honeycomb core laminate at a temperature increase rate of 1 to 50° C./min, a pressure of 0.1 to 0.7 MPa and a temperature of 130 to 180° C. for 10 to 30 minutes.

10. A method for manufacturing a carbon fiber-reinforced composite material, comprising:
laminating the prepregs according to claim 6 on both sides of a foam core to obtain a foam core laminate having a foam core therein;
sequentially stacking the foam core laminate and a film bag in a mold to seal the foam core laminate between the mold and the film bag; and
evacuating a space formed between the mold and the film bag and heating and pressing the foam core laminate at a temperature increase rate of 1 to 50° C./min, a pressure of 0.1 to 0.7 MPa and a temperature of 130 to 180° C. for 10 to 30 minutes.

* * * * *